United States Patent [19]

Gocze

[11] Patent Number: 5,313,933
[45] Date of Patent: May 24, 1994

[54] SOLAR COLLECTOR WITH FIBER MATERIAL ABSORBER LAYER

[76] Inventor: Thomas E. Gocze, 360 Center St., Bangor, Me. 04401

[21] Appl. No.: 926,165

[22] Filed: Aug. 5, 1992

[51] Int. Cl.$^5$ .............................. F24J 2/28; F24J 2/36
[52] U.S. Cl. ................................... 126/674; 126/676; 126/626
[58] Field of Search ............... 126/444, 449, 426, 674, 126/676, 563, 626

[56] References Cited

U.S. PATENT DOCUMENTS

| Re. 31,321 | 7/1983 | Harrison | 126/623 X |
|---|---|---|---|
| 3,369,539 | 2/1968 | Thomason | 126/426 X |
| 4,036,209 | 7/1977 | Press | 126/426 X |
| 4,257,396 | 3/1981 | Reinert | 126/426 |
| 4,267,021 | 5/1981 | Speros et al. | 126/449 X |
| 4,326,504 | 4/1982 | Guadard et al. | 126/674 |
| 4,396,007 | 8/1983 | Siemiller | 126/449 X |
| 4,414,961 | 11/1983 | Luebke | 126/449 X |
| 4,422,445 | 12/1983 | Pelley | 126/426 |
| 4,807,591 | 2/1989 | Stranicky | 126/426 |

FOREIGN PATENT DOCUMENTS

| 2463369 | 3/1981 | France | 126/449 |
|---|---|---|---|
| 1580803 | 12/1990 | United Kingdom | 126/449 |

Primary Examiner—Carl D. Price
Attorney, Agent, or Firm—Daniel H. Kane

[57] ABSTRACT

A solar collector converts solar radiation to heat energy over a specified surface area and collects the heat energy by trickle feeding a heat transfer fluid over a trickle feed absorber surface having improved absorber surface area to volume ratio. The elements of the solar collector include a glazing first layer for receiving and passing incident solar radiation over the specified surface area and an impervious backing layer spaced from the glazing first layer. The absorber layer is sandwiched between the glazing first layer and backing layer with the glazing first layer and backing layer contacting the absorber layer on opposite sides. The absorber layer is a layer of fiber material defining capillary channels and spaces in the absorber layer between the glazing first layer and backing layer. The fiber material absorber layer such as a dark synthetic felt layer is formed with a radiation absorbing color and defines a relatively high surface area to volume ratio trickle feed absorber surface through the absorber layer. A heat transfer fluid inlet channel is coupled to an open top end communicating with the absorber layer for trickle feeding heat transfer fluid by gravity through the capillary channels and spaces of the absorber layer. A heat transfer fluid outlet channel is coupled to an open bottom end communicating with the absorber layer for delivering heated fluid. The solar collector may be formed in a rigid plate configuration or in a flexible sheet configuration so that the solar collector can be rolled up for storage.

26 Claims, 3 Drawing Sheets

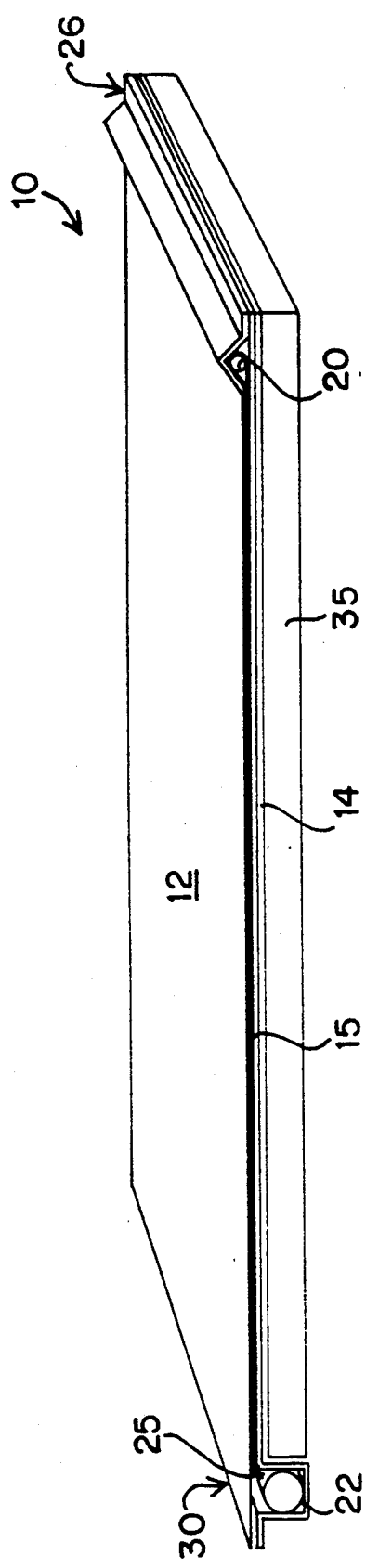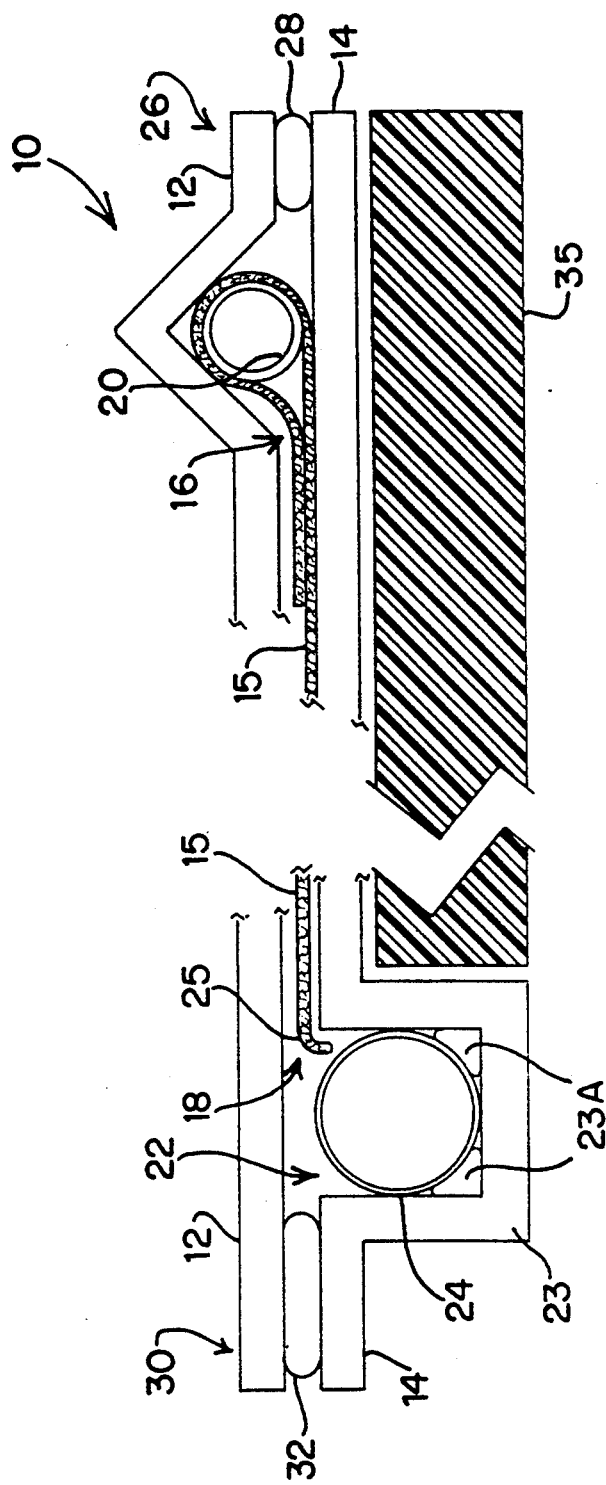

SOLAR COLLECTOR WITH FIBER MATERIAL ABSORBER LAYER

TECHNICAL FIELD

This invention relates to a new solar collector for converting solar radiation to heat energy over a specified surface area and for collecting the heat energy by trickle feeding a heat transfer fluid over an absorber surface. The invention provides improved trickle feed absorber surface area to absorber volume ratio by incorporating a fiber material absorber layer in the solar collector. The solar collector may be constructed in a rigid plate configuration or in a flexible plastic sheet configuration so that the solar collector can be rolled up for storage.

BACKGROUND ART

An example of a classical trickle feed solar collector is the Thomason solar collector in which a corrugated galvanized roofing absorber is mounted between an upper glazing layer and a backing layer of insulating material. The galvanized roofing corrugated absorber is covered with an appropriate absorbing color such as black, and the corrugations are oriented down hill for trickle feeding the heat transfer fluid. The heat transfer fluid is dispensed along the top of the collector by a heat transfer fluid inlet manifold. Heated fluid is delivered at the base of the solar collector by a heat transfer fluid outlet manifold such as a gutter. Such conventional trickle feed solar collectors are constructed in a variety of configurations and combinations from a variety of materials.

A disadvantage of the conventional trickle feed solar collector configuration is that the relatively low absorber surface area to absorber volume ratio for the galvanized roofing corrugated absorber layer can result in relatively inefficient heat transfer to the heat transfer fluid. A greater shortcoming of the conventional trickle feed solar collector is that condensation and fog from the rivulets of water or other heat transfer fluid passing down the corrugation valleys forms on the inside surface of the upper glazing layer, dispersing sunlight and interfering in the solar collection and absorption by the surfaces of the absorber.

Another disadvantage of the traditional trickle feed solar collector structures is that they are generally constructed and available only in standard sizes and can be constructed in custom sizes only at substantial additional expense.

OBJECTS OF THE INVENTION

It is therefore an object of the present invention to provide a new solar collector for converting solar radiation to heat energy over a specified surface area. An objective of the invention is to collect the heat energy by trickle feeding a heat transfer fluid over a trickle feed absorber surface with substantially increased trickle feed absorber surface area to absorber volume ratio.

Another object of the invention is to provide a new trickle feed solar collector which avoids condensation and fogging over the upper glazing surface which might otherwise interfere in the efficiency of solar collection and absorption at the underlying absorber layer.

A further object of the invention is to provide a solar collector structure and configuration which may be rapidly assembled from inexpensive materials in any desired surface area size and which may be constructed in either a rigid plate configuration or a flexible sheet configuration so that the solar collector can be rolled up for storage.

DISCLOSURE OF THE INVENTION

In order to accomplish these results the invention provides a glazing first layer for receiving incident solar radiation over the specified surface area and an impervious backing layer spaced from the glazing first layer. An absorber layer is sandwiched between the glazing first layer and backing layer, the glazing first layer and backing layer contacting the absorber layer on opposite sides.

According to the invention the absorber layer is a layer or sheet of fiber material defining capillary channels and spaces in the absorber layer between the fibers. The fiber material absorber layer is "sandwiched" between the glazing first layer and backing layer. The absorber layer of fiber material is formed with a radiation absorbing color and defines a relatively high absorber surface area to absorber volume ratio trickle feed absorber surface through the absorber layer.

The new solar collector is constructed with a collecting orientation having an open top end and an open bottom end communicating with the absorber layer. A heat transfer fluid inlet channel is coupled to the open top end communicating with the absorber layer. The heat transfer fluid may be distributed from the inlet channel or inlet manifold through inlet manifold openings into the absorber layer fiber material with a slight positive pressure. The heat transfer fluid then trickle feeds by gravity through the capillary channels and spaces of the absorber layer. A heat transfer fluid outlet channel or outlet manifold is coupled to the open bottom end for receiving and delivering the heated fluid.

According to the invention the glazing first layer and backing layer may be constructed from rigid plastic plates or from flexible plastic sheets so that the solar collector can be rolled up for storage. In the preferred example embodiment, the absorber layer of fiber material is a layer of black felt or other nonwoven fiber material of a radiation absorbing color sandwiched between the glazing first layer and backing layer. The glazing first layer and backing layer are formed, for example, of polycarbonate plastic for durability and resistance to radiation deterioration.

According to the another feature of the invention, the first glazing layer and backing layer overlap the heat transfer fluid inlet and outlet channels and the absorber layer forming overlapping top and bottom edges and side edges of the solar collector. The first glazing layer and backing layer, typically plastic layers, are bonded together at the top and bottom edges and side edges of the solar collector.

In the preferred example the heat transfer fluid inlet channel is a pipe or tube coupled to a heat transfer fluid source and formed with openings or holes for communicating with the absorber layer at the open top end for distributing heat transfer fluid. The glazing first layer extends over the inlet channel tube at the top end of the solar collector. The absorber layer of fiber material is wrapped around the inlet channel tube under the glazing first layer in contact with the openings or holes to assure trickle feeding of the heat transfer fluid from the inlet channel tube into the absorber layer. The heat transfer fluid source may be pressurized for distributing heat transfer fluid through the holes with slight positive pressure.

The heat transfer fluid outlet channel or outlet manifold may be in the configuration of a gutter formed inside the backing layer and coupled to the absorber layer at the open bottom end. The gutter is open at the top and the terminating end of the fiber material absorber layer enters the open top of the gutter for delivering heated fluid. The stub end of a tube is bonded to the open end of the gutter to provide a tubular outlet. The glazing first layer and backing layer also overlap the heat transfer fluid outlet channel gutter tube and absorber layer, forming the overlapping bottom edges and side edges where the glazing first layer and bottom layer are bonded together.

Other fiber materials may also be used for the absorber layer. For example a woven fabric layer printed in a color design pattern may be used for radiation absorption and aesthetic appearance. A variety of materials may also be used for the glazing layer and backing layer. An insulating layer may be formed adjacent to the backing layer for increased efficiency.

Other objects, features and advantages of the invention are apparent in the following specification and accompanying drawings.

BRIEF DESCRIPTION OF THE DRAWINGS

FIG. 1 is a perspective view from a side of the solar collector with the side cut away showing the configuration of elements of the solar collector according to the invention.

FIG. 2 is a detailed diagrammatic side cross section view of the solar collector.

DESCRIPTION OF PREFERRED EXAMPLE EMBODIMENTS AND BEST MODE OF THE INVENTION

Figure 2A:
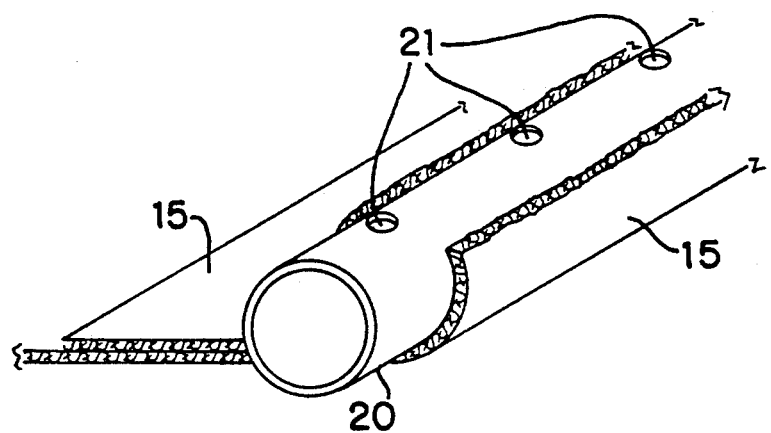
FIG. 2A is a detailed fragmentary plan view with the absorber layer partially cut away showing the heat transfer fluid inlet manifold pipe or tube formed with drilled holes for trickle feeding heat transfer fluid into the absorber layer.

A solar collector 10 according to the invention is illustrated in FIGS. 1 and 2. A top glazing layer 12 is formed over the solar collector. The glazing layer 12 is a relatively rigid plate of transparent plastic material such as Lexan (TM) polycarbonate plastic. Other relatively transparent plastic materials as well as glass may be used for the glazing layer 12. The glazing layer 12 may also be formed of a flexible plastic sheet as hereafter described permitting the entire solar collector to be rolled up for storage.

A backing layer or bottom layer 14 is positioned below the top glazing layer 12 spaced from the glazing layer 12 by the absorber layer 15. The backing layer 14 may also be provided by a polycarbonate plastic plate or sheet but need not be transparent unless both sides of the solar collector are used for collecting and absorbing incident radiation. The backing layer 14 may similarly be a relatively rigid plate for a solar collector in a rigid plate configuration or a flexible sheet so that the solar collector may be rolled up for storage.

The absorber layer 15 is a layer of fibrous material sandwiched between the top glazing layer 12 and backing layer 14. In the best mode example, the absorber layer 15 is a layer of black synthetic felt. Additional preferred examples include sheets of other nonwoven fiber materials formed with a dark color for more efficient absorption and conversion of incident radiation to heat energy. Woven fabrics may also be used for the absorber layer and dark color print patterns may be formed on the fabric for aesthetic effect.

In each example however the absorber layer 15 is a fiber material layer filling the space between the upper glazing layer 12 and backing layer 14 with a relatively high falling from the terminating end 25 of the absorber layer 15 and providing a tubular outlet.

Figure 2B:
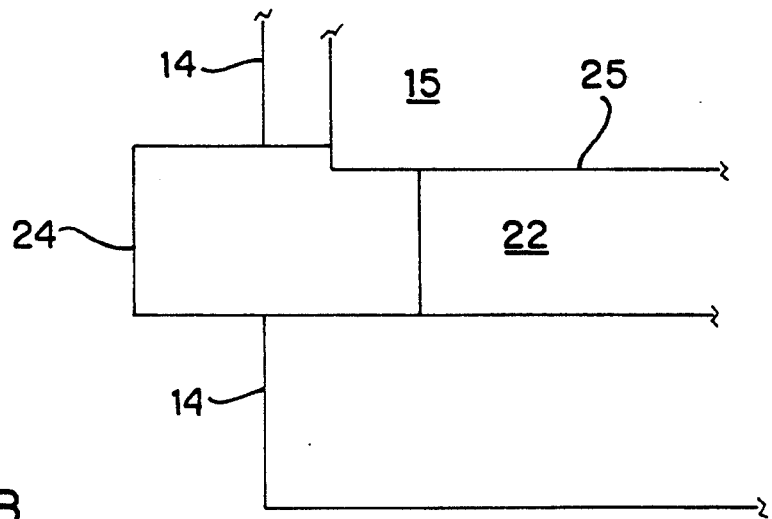
FIG. 2B is a detailed fragmentary plan view with the upper glazing layer cut away showing the outlet manifold and manifold stub end pipe or tube for delivering heated fluid from the terminating end of the fiber material absorber layer.
Figure 2C:
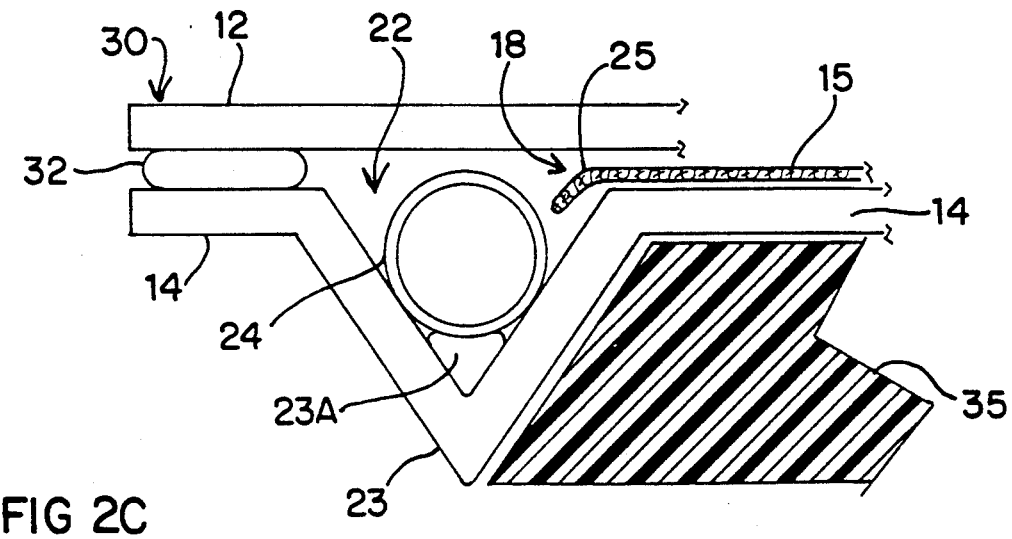
FIG. 2C is a detailed fragmentary side cross section of an alternative outlet manifold configuration.

In the example of FIGS. 2 and 2B, the outlet manifold 22 is provided by a gutter 23 of rectangular configuration open at the top. The open bottom end 18 of the solar collector 10 opens directly into the gutter 23. An alternative V shape configuration for the gutter 23 is illustrated in FIG. 2C. The V shape configuration gutter can be more readily formed in the sheet plastic. Corresponding elements and components are indicated by the same reference numerals as in FIG. 2B.

As further shown in FIGS. 1 and 2 the glazing layer 12 extends beyond and overlaps the inlet feed manifold 20 and fiber material absorber layer 16 to form an upper edge 26 of the solar collector. The backing layer 14 also overlaps the inlet feed manifold 20 and fiber material layer 15 to complete the upper edge 26 of the solar collector. The overlapping ends of the upper glazing layer 12 and backing layer 14 are bonded together sealing the upper edge 26 of the solar collector. The overlapping layers may be bonded together at the upper edge 26 of the solar collector using for example a durable waterproof adhesive glue 28.

Similarly at the lower end of the solar collector 10 the upper glazing layer 12 overlaps the outlet gutter 22 and outlet manifold pipe 24 to form part of the lower edge 30 of the solar collector. The backing layer 14 also overlaps the outlet manifold pipe 24 to complete the lower edge 30. The overlapping ends are bonded together using for example the waterproof adhesive glue 32 sealing the lower edge 30 of the solar collector. Along the sides of the solar collector, the upper glazing layer 12 and backing layer 14 are formed with overlapping side edges bonded together to form the side edges of the solar collector.

Figure 3:
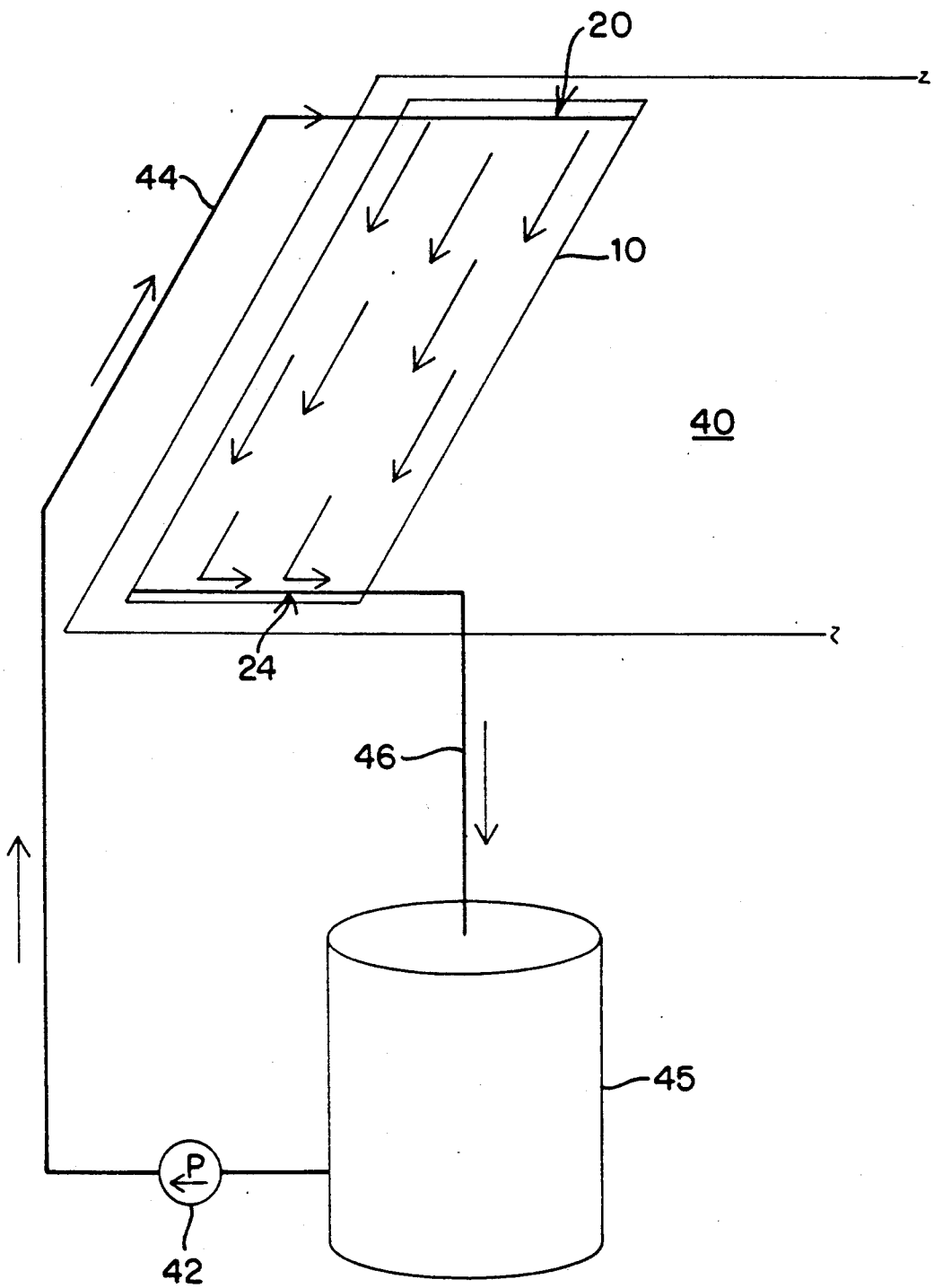
FIG. 3 is an environmental view of the solar collector in collecting orientation mounted for example, on a roof surface and coupled in a solar heat collecting and storage system.

The fragmentary detailed plan view of the inlet feed manifold pipe 20 illustrated in FIG. 2A shows one pattern of surface area to volume ratio trickle feed absorber surface provided by the fiber surfaces. The fibers define capillary channels and spaces filling the absorber layer 15 between the upper glazing layer 12 and backing layer 14. The fiber layer typically has a thickness in the range of 1/32"-⅛" (0.07 cm-0.3 cm). A heat transfer fluid therefore "trickle" feeds at a relatively low rate through the capillary channels and spaces under gravity from the open inlet top end 16 to the open outlet bottom end 18 when the solar collector is mounted in solar collecting orientation as illustrated in FIG. 3.

As shown in FIGS. 2 & 2A, an inlet manifold or inlet channel 20 for feeding heat transfer fluid communicates with the top open end 16 of the solar collector sandwich formed by upper glazing layer 12 backing layer 14 and absorber layer 15. The inlet manifold 20 is provided by a pipe drilled with holes for feeding heat transfer fluid into the fiber material absorber layer 16. To assure efficient trickle feeding of heat transfer fluid, the fiber material layer or sheet 16 is wrapped around the feed manifold pipe 20 so that openings or holes 21 formed in the inlet manifold pipe 20 directly contact and communicate with the fiber material layer.

The lower open end 18 of the solar collector sandwich formed by upper glazing layer 12, backing layer 14 and absorber layer 15 opens to the outlet channel or manifold 22 which may simply be a gutter 23 formed in the backing sheet 14. The lower terminating end 25 of the fiber material layer 15 drapes into the top of the gutter 23 for collecting the heated fluid trickling down through the capillary channels and spaces defined by the absorber layer 15 between the upper glazing layer 12 and backing layer 14. As shown in FIGS. 2, outlet manifold 22 may also be provided with a stub end section of pipe or tube 24 bonded to the gutter 23 and forming a seal 23a for receiving the heated fluid drilled holes for trickle feeding heat transfer fluid to the fiber material absorber layer wrapped around the pipe. Other patterns of holes or openings may also be used for distributing the heat transfer fluid.

It is noted that the fiber material absorber layer 15, for example synthetic black felt, fills the absorber layer space between the upper glazing layer 12 and backing layer 14. Glazing layer 12 and backing layer 14 contact the absorber layer fiber material on opposite sides. By this arrangement condensation or fog cannot form on the inside of the glazing layer which might otherwise interfere with and disperse incident solar radiation. The inside surface of glazing layer 12 is continually washed by the heat transfer fluid passing in the capillary channels and spaces defined between the fibers of the absorber layer. The continuous washing of the inside surface of the glazing layer forms an optically efficient interface for passing incident solar radiation to the dark colored fibers of the absorber layer.

As shown in FIGS. 1 and 2 the solar collector 10 may also be formed with an insulating layer 35 mounted against the backing sheet 14. The insulation layer 35 impedes heat loss from the absorber layer 15 for increased efficiency in solar radiation absorption and conversion to heat energy to be collected by the heat transfer fluid. The insulating layer 35 may be, for example a rigid layer of foam insulation where the solar collector is formed in a rigid plate configuration. When the solar collector is formed as a flexible sheet, the back insulation layer 35 may be formed of a flexible fiber or foam layer of insulation so that it can be rolled up with the solar collector for storage.

The outer glazing layer side of the solar collector 10 can also be insulated by using multiple transparent glazing layers appropriately spaced. The multiple glazing with trapped layers of air, gas, or vacuum impede heat loss by conduction to the outside environment.

According to an alternative embodiment without a back insulation layer 35, the backing layer 14 is also formed as a second glazing layer for solar energy collection from both sides of the solar collector 10. Mirrors or reflectors may be used to return solar energy so that the solar radiation is incident upon both sides of the solar collector.

A typical installation of the solar collector 10 on a roof surface or other angled surface 40 is illustrated in FIG. 3. The solar collector 10 is mounted in a collecting orientation at an appropriate angle for optimizing incident solar radiation. A pump 42 delivers heat transfer fluid through the delivery line 44 from an insulated heat transfer fluid storage tank 45. Such a tank may be a portable collapsible insulated tank for storing solar heated liquid as described, for example in the Gocze U.S. Pat. No. 4,660,594, issued Apr. 28, 1987 for PORTABLE COLLAPSIBLE TANK FOR STORING LIQUID. The pump 42 delivers heat transfer fluid to the inlet manifold 20 with slight positive pressure for efficient distribution through the openings 21 of the inlet manifold.

The heat transfer fluid pumped through delivery line 44 enters the open top end of the solar collector 10 through the heat transfer fluid inlet manifold 20. The heat transfer fluid is distributed across the top of the fiber material absorber layer for trickle feeding by gravity down through the capillary channels and spaces defined by the fiber material layer to the outlet manifold 24. From the outlet manifold 24 the heated fluid returns through return line 46 to the insulated storage tank 45.

In a typical installation, 1 to 2 gallons storage tank capacity in insulated storage tank 45 is provided for each square foot of solar collector surface area. The solar collectors 10 may be constructed in either standard solar collector sizes of 4'×8' or in any desired size and configuration because of the ease of assembly of the materials and the availability of the constituent materials in any desired sizes. Two hundred square feet of solar collector surface area as described above can provide modest space heating requirements of an average family house and can easily be doubled or tripled in size to provide domestic hot water requirements for an average family. By use of the materials and configurations of the present invention, the cost per square foot for solar collector area over conventional solar collectors may be reduced from the conventional range of seventeen to eighteen dollars per square foot to seven to eight dollars per square foot and as low as four to five dollars per square foot.

While the invention has been described with reference to particular example embodiments it is intended to cover all variations and equivalents within the scope of the following claims.

I claim:

1. A solar collector for converting solar radiation to heat energy over a specified surface area and for collecting the heat energy comprising:
   a glazing first layer for receiving and passing incident solar radiation over the specified surface area;
   an impervious backing layer spaced from the glazing first layer;
   an absorber layer sandwiched between the glazing first layer and backing layer, said glazing first layer and backing layer contacting the absorber layer on opposite sides across said surface area of the solar collector to avoid condensation and fogging on the inside surface of the glazing first layer;
   said absorber layer comprising a layer of woven or nonwoven fabric fiber material having radiation absorbing surfaces defining capillary channels and spaces in the absorber layer between the glazing first layer and backing layer, said absorber layer of fabric fiber material being formed with a radiation absorbing color and defining a relatively high surface area to volume ratio trickle feed absorber surface through the absorber layer;

said solar collector being constructed with a collecting orientation having an open top end and an open bottom end communicating with the absorber layer;

a heat transfer fluid inlet channel coupled to the open top end communicating with the absorber layer for trickle feeding heat transfer fluid by gravity through the capillary channels and spaces of the absorber layer, and a heat transfer fluid outlet channel coupled to the open bottom end for delivering heated fluid;

said first glazing layer and backing layer defining the walls of a circulating manifold contacting and confining the absorber layer and heat transfer fluid between the heat transfer fluid inlet and outlet channels.

2. The solar collector of claim 1 wherein the backing layer comprises a glazing second layer.

3. The solar collector of claim 2 wherein the glazing first and second layers comprise transparent rigid plastic plates.

4. The solar collector of claim 2 wherein the glazing first and second layers comprise flexible plastic sheets constructed so that the solar collector can be rolled up for storage.

5. The solar collector of claim 1 wherein the glazing first layer and backing layer comprise flexible sheets constructed so that the solar collector can be rolled up for storage.

6. The solar collector of claim 1 wherein the absorber layer of fiber material comprises a layer of dark color felt sandwiched between the glazing first layer and backing layer.

7. The solar collector of claim 6 wherein the glazing first layer and backing layer comprise polycarbonate plastic.

8. The solar collector of claim 7 wherein the polycarbonate plastic layers comprise rigid plates.

9. The solar collector of claim 1 wherein the glazing first layer and backing layer overlap the heat transfer fluid inlet and outlet channels and the absorber layer forming top and bottom edges and side edges of the solar collector and wherein the glazing first layer and backing layer are bonded together at said top and bottom edges and side edges of the solar collector.

10. The solar collector of claim 7 wherein the polycarbonate plastic first glazing layer and backing layer overlap the heat transfer fluid inlet and outlet channels and the absorber layer forming top and bottom edges and side edges of the solar collector and wherein the polycarbonate plastic layers are bonded together at said top and bottom edges and side edges.

11. The solar collector of claim 1 wherein the heat transfer fluid inlet channel comprises a pipe or tube coupled to a heat transfer fluid source and formed with at least one opening for communicating with the absorber layer at the open top end for distributing heat transfer fluid, said glazing first layer being formed over the inlet channel tube at the open top end of the solar collector and wherein the absorber layer of fabric fiber material is wrapped around the inlet channel tube under the glazing first layer to assure trickle feeding of the heat transfer fluid from the inlet channel tube into the absorber layer.

12. The solar collector of claim 11 wherein the glazing first layer and backing layer overlap the heat transfer fluid inlet channel tube and absorber layer to form an overlapping top edge of the solar collector, wherein the glazing first layer and backing layer are bonded together at the top edge of the solar collector, and wherein the absorber layer of fabric fiber material is wrapped all the way around the inlet channel tube contacting itself on the other side for fully enclosing the inlet channel tube (FIGS. 2 and 2A).

13. The solar collector of claim 12 wherein the heat transfer fluid outlet channel comprises a gutter formed inside the backing layer and coupled to the absorber layer at the open bottom end, said gutter being an open channel and said absorber layer of fiber material having a terminating end at the open channel of the gutter for delivering heated fluid.

14. The solar collector of claim 13 wherein the glazing first layer and backing layer overlap the heat transfer fluid outlet channel gutter and absorber layer forming an overlapping bottom edge of the solar collector and wherein the glazing first layer and bottom layer are bonded together at an overlapping bottom edge of the solar collector.

15. The solar collector of claim 1 further comprising an insulating layer formed adjacent to the backing layer.

16. The solar collector of claim 1 wherein the absorber layer of fiber material comprises a synthetic nonwoven fiber layer.

17. The solar collector of claim 1 wherein the absorber layer of fiber material comprises a woven fabric layer.

18. The solar collector of claim 17 wherein the woven fabric layer is printed in a color design pattern for radiation absorption and aesthetic appearance.

19. The solar collector of claim 16 wherein the fiber material absorber layer comprises a dark synthetic felt material.

20. A solar collector for converting solar radiation to heat energy over a specified surface area and for collecting the heat energy by trickle feeding heat transfer fluid over an absorber surface, comprising:

a glazing first layer for receiving and passing incident solar radiation over the specified surface area;

an impervious backing layer spaced from the glazing first layer;

an absorber layer sandwiched between the glazing first layer and backing layer, said glazing first layer and backing layer contacting the absorber layer on opposite sides across said surface area of the solar collector to avoid condensation and fogging on the inside surface of the glazing first layer;

said absorber layer comprising a layer of woven or nonwoven fabric fiber material having radiation absorbing surfaces defining capillary channels and spaces in the absorber layer between the glazing first layer and backing layer, said absorber layer of fabric fiber material being formed with a radiation absorbing color and defining a relatively high surface area to volume ratio trickle feed absorber surface through the absorber layer;

said solar collector being constructed with a collecting orientation having an open top end and an open bottom end communicating with the absorber layer;

a heat transfer fluid inlet channel coupled to the open top end communicating with the absorber layer, said heat transfer fluid inlet channel being formed with at least one opening for trickle feeding heat transfer fluid by gravity through the capillary channels and spaces of the absorber layer, said glazing first layer being formed over the heat transfer fluid inlet channel at the open top end of the solar collector, said absorber layer of fabric fiber material being wrapped around the heat transfer fluid inlet channel under the glazing first layer for trickle feeding of the heat transfer fluid from the at least one opening of the heat transfer fluid inlet channel into the absorber layer;

said glazing first layer and backing layer overlapping the heat transfer fluid inlet channel and absorber layer to form a top edge of the solar collector, said glazing first layer and backing layer being bonded together at the top edge of the solar collector;

and a heat transfer fluid outlet channel coupled to the open bottom end communicating with the absorber layer for delivering heated fluid, said heat transfer fluid outlet channel being formed inside the backing layer at the open bottom end of the solar collector communicating with the absorber layer, said absorber layer of fabric fiber material being formed with a terminating end at said outlet channel for delivering heated fluid, said glazing first layer and bottom layer overlapping the heat transfer fluid outlet channel and absorber layer to form a bottom edge of the solar collector, said glazing first layer and backing layer being bonded together at the bottom edge of the solar collector;

said first glazing layer and backing layer defining the walls of a circulating manifold contacting and confining the absorber layer and heat transfer fluid between the heat transfer fluid inlet and outlet channels.

21. The solar collector of claim 20 wherein the absorber layer of fiber material comprises a layer of dark color felt sandwiched between the glazing first layer and backing layer.

22. The solar collector of claim 21 wherein the glazing first layer and backing layer comprise sheets of polycarbonate plastic.

23. The solar collector of claim 21 wherein the glazing first layer and backing layer comprise flexible sheets constructed so that the solar collector can be rolled up for storage.

24. The solar collector of claim 20 wherein the glazing first layer and backing layer overlap the absorber layer at side edges and wherein the glazing first layer and backing layer are bonded together at said side edges of the solar collector.

25. The solar collector of claim 20 wherein the absorber layer of fabric fiber material comprises a layer of dark synthetic nonwoven fiber material, wherein the heat transfer fluid inlet channel comprises a tube, and wherein the absorber layer of fabric fiber material is wrapped all the way around the heat transfer fluid inlet channel tube contacting itself on the other side for fully enveloping the inlet channel tube (FIGS. 2 and 2A).

26. The solar collector of claim 20 comprising a pump coupled for delivering heat transfer fluid to the inlet channel with slight positive pressure for distributing heat transfer fluid.

* * * * *